J. O'DAY & F. SMITH.
BUNK MECHANISM FOR LOGGING AND LUMBER CARS AND SLEDS.
APPLICATION FILED JAN. 13, 1911.
1,034,494.
Patented Aug. 6, 1912.
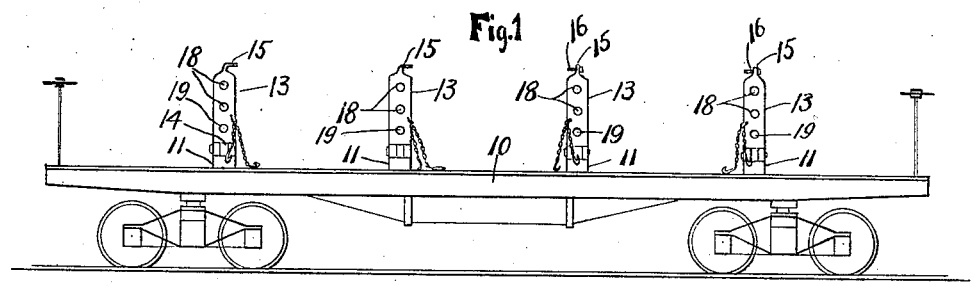
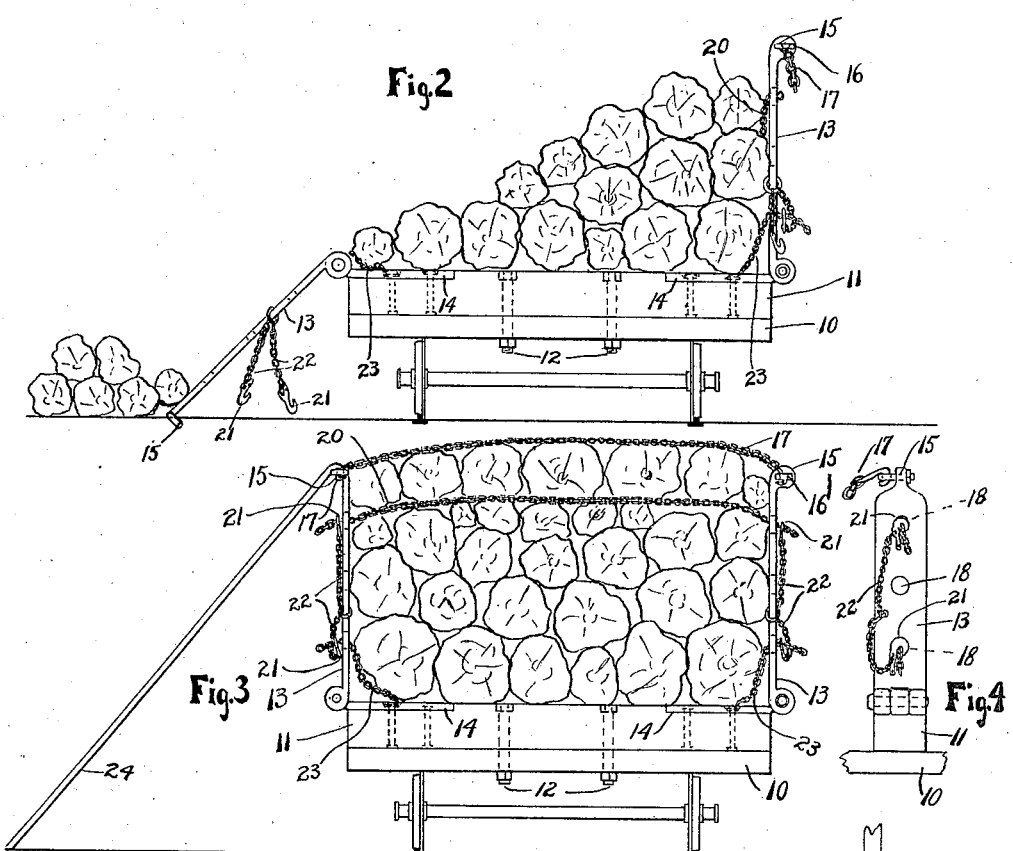
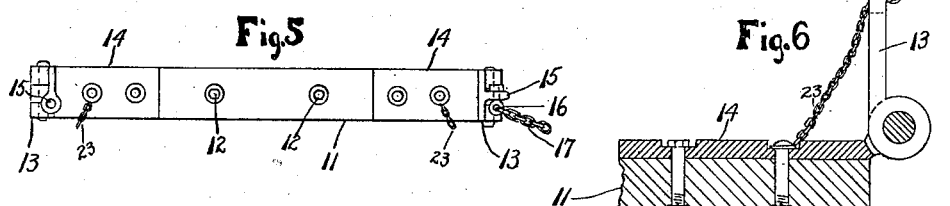
WITNESSES
L. C. French
Laura A. Kelley
INVENTORS
John O'Day & Fredrick Smith
By Morsell & Caldwell
ATTORNEYS

UNITED STATES PATENT OFFICE.

JOHN O'DAY AND FREDRICK SMITH, OF MERRILL, WISCONSIN.

BUNK MECHANISM FOR LOGGING AND LUMBER CARS AND SLEDS.

1,034,494.

Specification of Letters Patent. Patented Aug. 6, 1912.

Application filed January 13, 1911. Serial No. 602,535.

*To all whom it may concern:*

Be it known that we, JOHN O'DAY and FREDRICK SMITH, citizens of the United States, residing in Merrill, in the county of Lincoln and State of Wisconsin, have invented new and useful Improvements in Bunk Mechanism for Logging and Lumber Cars and Sleds, of which the following is a description, reference being had to the accompanying drawings, which are a part of this specification.

This invention relates to improvements in bunk mechanism for logging and lumber cars and sleds.

It is the present day practice in transporting lumber and logs on flat cars or sleds to place a line of vertical wooden stakes on each side of the car or sled, place the logs or lumber therebetween and then extend a chain around the material to hold it in position. The wooden stakes often become broken or the chain unhooked and the lumber is scattered along the right of way of the road. This entails a considerable loss and ofttimes endangers the lives of the persons on the train or the train following thereafter.

It is one of the objects of this invention to provide a bunk mechanism which is adapted to overcome the before mentioned objectionable features and to provide a mechanism which is strong and durable and which will securely hold logs or lumber on a car or sled during transportation.

A further object of the invention is to provide a bunk mechanism which may be easily fastened to cars or sleds and when fastened, the construction provides an efficient means for simplifying the loading and unloading of the car or sled with lumber or logs and when loaded with logs or lumber may be securely supported and fastened in position on the car or sled.

A further object of the invention is to provide a bunk mechanism in which the vertical stakes are hinged to the ends of the bunks or transverse supporting timbers and are adapted to be used as side stakes when swung upwardly and when swung downwardly at an angle to be used as skids upon which the lumber or logs are rolled or slid in loading or unloading the cars.

With the above, and other objects in view, the invention consists of the bunk mechanism and its parts and combinations as set forth in the claims, and all equivalents thereof.

In the accompanying drawing in which the same reference characters indicate the same parts in all of the views: Figure 1 is a side view of a flat car provided with the improved bunk mechanism; Fig. 2 is an end view thereof with the improved stakes on one side of the car swung downwardly and serving as skids on which the logs are rolled in loading; Fig. 3 is an end view of the car completely loaded with logs; Fig. 4 is a detailed side view of one of the stakes and the end of the bunk; Fig. 5 is a plan view of one of the bunks; and, Fig. 6 is a longitudinal sectional view of a portion of one of the bunks and the stake connected thereto.

Referring to the drawing the numeral 10 indicates an ordinary flat car on the platform of which are mounted bunks or transversely positioned supporting timbers 11. The bunks are fastened to the car by means of bolts 12 which extend through the bunks and the car platform and are provided with nuts on their lower ends. Stakes 13 hinged to the eyed members 14 which are bolted to the bunks 11 are adapted to be held normally in vertical position and are provided with eyes 15 formed at their upper ends. The stakes on one side of the car are provided with eyed bolts 16 to which are hooked the upper chains 17 which are adapted to extend over the load and to be hooked into the eyes of the stakes on the opposite side of the car. The stakes are provided with a plurality of chain openings 18 and 19 through which other load securing chains 20 are adapted to extend. The last mentioned chains are extended through the chain openings and are engaged by the locking hooks 21 of short chains 22 fastened to the stakes. The locking hooks are of larger size than the chain openings so that when hooked over the links of the chains, the chains cannot pull through the chain openings and are consequently locked in taut position. The eyed members 14 carry short protecting chains 23 which are adapted to be extended through the first openings above the eyes of the eyed member 14 and locked taut by the locking hooks 21. These chains serve to protect the hinge joints of the stakes and to hold the stakes in vertical position. The long skids 24 are adapted to be hooked into the eyes of the stakes when in vertical position to complete the loading of the cars.

In use in connection with cars or sleds the stakes on one side of the car are dropped to form skids while the stakes on the opposite side of the car are held in upright position by means of the short chains connected to the eyed members. The logs are now rolled up the inclined stakes or skids and when the car is filled, the inclined stakes are swung upwardly to vertical position and fastened with the short protecting chains. The chains are now stretched over the logs and extended through the upper chain openings and fastened by means of the locking hooks and if desired, another row of logs are placed on top of the chained logs and the upper chain is stretched over these logs and the ends of the chains hooked into the eyed bolts and the upper eyed ends of the stakes thus securely and firmly locking the logs in position.

From the foregoing description it will be seen that the bunk mechanism permits the loading and unloading of logs or lumber in a very simple manner and when loaded, the material is firmly secured in position.

What we claim as our invention is:

1. A bunk mechanism, comprising a supporting member provided with eyed members at its ends and having short chains connected thereto, means for connecting said supporting members to a transporting device, stakes connected to the eyed members and provided with eyed ends and having chain openings therein, said stakes arranged to be swung to an upright position when used as stakes and to be swung to a downwardly inclined position when used as skids, said short chains arranged to be extending through some of the chain openings and secured to hold the stakes in upright position, a chain extending from the eye of one stake to the eye of the other stake and connected thereto, another chain extending through the chain openings of the stakes, and short chains connected to the stakes and provided with grab hooks for locking the other chains to the stakes.

2. A bunk mechanism, comprising a transversely extending supporting member, eyed members bolted to the opposite end portions of said member and having short chains connected thereto, means for connecting said transverse member to a transporting device, stakes pivoted to the eyed members and having openings formed in their upper ends and at a plurality of intermediate points between the ends, said stakes adapted to be swung to an upright position when used as stakes and to a downwardly inclined position when used as skids, short chains connected to intermediate portions of the stakes and provided with grab hooks, the short chains of the eyed members adapted to extend through one of the openings of the stakes and to be engaged by one of the grab hooks for releasably locking the stakes in upright position, and a chain extending through the openings in the upper portions of the stakes and engaged by one of the grab hooks for bracing the stakes in upright position.

3. A bunk mechanism, comprising a transversely extending supporting member, eyed members bolted to the opposite end portions of said member and having short chains connected thereto, means for connecting said transverse member to a transporting device, stakes pivoted to the eyed members and having openings formed in their upper ends and at a plurality of intermediate points between the ends, said stakes adapted to be swung to an upright position when used as stakes and to a downwardly inclined position when used as skids, short chains connected to intermediate portions of the stakes and provided with grab hooks, the short chains of the eyed members adapted to extend through one of the openings of the stakes and to be engaged by one of the grab hooks for releasably locking the stakes in upright position, a chain extending through the openings in the upper portions of the stakes and engaged by one of the grab hooks for bracing the stakes in upright position, an eyed bolt extending through the upper opening of one of the stakes, and a chain extending from the eyed bolt to and connected to the upper end of the other stake.

In testimony whereof, we affix our signatures, in presence of two witnesses.

JOHN O'DAY.
FREDRICK SMITH.

Witnesses:
JOHN VAN HECKE,
MARY VAN HECKE.

---

Copies of this patent may be obtained for five cents each, by addressing the "Commissioner of Patents, Washington, D. C."